United States Patent Office 3,453,172
Patented July 1, 1969

3,453,172
BONDING GRAPHITE WITH FUSED SILVER CHLORIDE
James E. Webb, Administrator of the National Aeronautics and Space Administration with respect to an invention of Richard D. Faulkner, Lancaster, Pa.
No Drawing. Filed Oct. 8, 1965, Ser. No. 494,282
Int. Cl. B32b 9/04
U.S. Cl. 161—182　　　　　　　　　　　　12 Claims

ABSTRACT OF THE DISCLOSURE

A technique for bonding graphite to graphite, or to silver, glass, ceramics and metals below silver in the electromotive force series, wherein a layer of silver chloride is fused to the graphite.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates to a method for bonding graphite to other materials and more particularly to the utilization of silver chloride in such bonding. Specifically, this invention provides a bonding technique whereby firm bonds of silver chloride are provided between graphite elements and between and between graphite and silver, glass, ceramics and metals below silver in the electromotive force series.

The problem of adhering graphite to itself or other materials has resulted in a myriad of proposals and techniques to effectuate such bonding. Generally, a mechanical soltion has proved most satisfactory, such techniques as clamping, bolting and riveting, tapping and threading, force and shrink fitting, and powder tamping being most common expedients. However, such techniques as clamping or tamping require external structure resulting in wasted space while bolting, riveting, tapping or threading results in a weakened product and increased manufacturing expense. Force and shrink fitting are also limited in application not only by external structure but also by requisite low use temperatres to maintain the fit. Besides the above, any such mechanical means may result in a product which is neither vacuum nor water tight.

Adhesive bonding has also been attempted but has met with little favor because the bonding material lacks thermal and electrical conductivity and lacks the ability to stand up under high temperatures and corrosive conditions.

As an alternative to the above proposals it has been suggested that graphite be bonded by soldering or brazing techniques. However, most molten metals do not wet graphite so it has been necessary to first coat the graphite with metal by electroplating or by metal spraying processes and thereafter solder or braze to the coated graphite. Even with such an elaborate system the bond is not strong so the connection cannot be utilized in environments where high strength is a requisite. In more recent years it has been suggested that platinum under controlled atmospheres may be utilized for melt bonding graphite articles but expense and construction render such a technique unsuitable for normal graphite applications.

Therefore, it is a principal object of the present invention to provide a method for bonding graphite to itself or other materials which maintains good strength even under relatively high temperature operating condition while requiring minimal expenditure for bonding material.

It is a further object of the present invention to provide a bonding technique for graphite which obviates the need for bulky external mechanical structure or weakening apertures or cut outs in the graphite structure.

It is another object of this invention to provide a method of bonding graphite in which the bonding material is thermally and electrically conductive with good stability characteristics under corrosive conditions.

It is still another object of the present invention to provide a bonding technique which may be effected under atmospheric or controlled conditions to produce a water and vacuum tight seal between graphite articles or between graphite articles and noble metals, ceramics, or glass.

It is still a further object of this invention to provide a method for bonding graphite which may be effected without requiring pre-coatings to the graphite.

It is still another object of this invention to provide a graphite structure which may be easily bonded to a number of materials and a composite structure so produced.

These and other objects will become apparent from a consideration of the following description and claims.

Briefly, the method of the instant invention comprises the placement of silver chloride (AgCl) between the graphite and the article to which it is to be bonded, heating the silver chloride to a temperature equal to or above its fusion temperature (approximately 455° C.) and thereafter cooling to atmospheric temperature. This technique is applicable for bonding one graphite surface to another or to bond a graphite surface to silver or metal below silver in the electro-motive series. It is also applicable to bonding glass or ceramic materials to graphite either directly or preferably through use of an inner noble metal substrate.

To accomplish the above defined method it is generally preferred to utilize a wafer of silver chloride between the materials to be bonded. Such wafer should have a surface area approximately equal to the area of contact between the mating parts. However, in some instances slight overlaps of the wafer area are desirable while adequate bonds may be provided on a point rather than a full surface contact basis. The wafer should be approximately 1 mm. in thickness for optimum bond strength with most graphite although thicknesses as small as .25 mm. provide good bonding action. Thicknesses greater than 3 mm. can be used but without an increase in bonding strength. The greater thicknesses are used with lower density graphite articles because of the higher permeabilities.

Besides the wafer application technique it is also possible to apply the silver chloride by both powder and spray methods. The powder application merely involves placing the graphite so that the surface to be bonded is horizontal, pouring the silver chloride in particulate form thereon, placing the material to be bonded to the graphite thereover and heating as defined above. At the fusion temperature, the silver chloride forms a constant depth film between the bonded elements so that upon cooling the thickness is constant.

The spray technique may comprise either melt or solid application. In the melt technique, the silver chloride is sprayed in molten form on the graphite substrate with the material to be bonded placed thereover before solidification. Alternatively, the molten material-graphite substrate combination may be cooled and thereafter utilized in a subsequent fusion bonding step. A reverse procedure may be utilized wherein the silver chloride is sprayed on the material to be bonded to the graphite and thereafter the graphite applied either before solidification or in a subsequent fusion bonding step. Solid application by the spray technique involves forming either a slurry or solution of the silver chloride, spraying the graphite base and thereafter evaporating the carrier solution.

Another alternative method includes preheating the graphite base above the silver chloride fusion temperature and applying solid silver chloride thereto which immediately melts to form the desired wafer structure.

The heating of the silver chloride layer may be effected by placing the entire structure in a furnace or by induction or conduction electrical heating methods. In order to protect some of the bonded materials from oxidation it is often desirable to utilize an inert atmospheric during heating. Atmospheres found suitable include nitrogen, argon and helium. Also the heating may be carried out under vacuum to alleviate the above problem.

It is not generally necesary to provide any clamping of the structure during bonding since the weight of the material to be bonded to the graphite will be sufficient to provide contact between the silver chloride, the base graphite and the material to be bonded. However, in some instances it may be desirable to temporarily clamp the composite article during heating particularly when the material to be bonded is very thin or the heating is to be effected while the composite structure is vertically stacked.

As pointed out above, when it is desired to bond graphite to glass or ceramic materials it is preferable to metallize these latter materials with one of the noble metals such as gold, silver, platinum, palladium, iridium, rhodium, ruthenium or osmium. These metals may be applied by standard spray or electrochemical techniques which are well known and form no part of the instant invention.

Example I

A graphite block was placed on a horizontal surface and a wafer of high purity silver chloride 1 mm. thick placed thereover; said wafer being cut to exactly cover the surface of the block. A thin sheet of silver (.3 mm. thick) of similar area was placed over the wafer and the thus formed sandwich was heated to 460° C. in a nitrogen atmosphere. Upon cooling the resultant composite exhibited high strength and good thermal and electrical conductivity. Temperature up to 400° C. did not appreciably diminish the strength.

Example II

A similar block as in Example I was placed on a horizontal plane and powdered silver chloride poured and spread thereon to a thickness of about 3 mm. A sheet of glass which had been silver plated was placed thereover and the composite heated under vacuum to 457° C. This product exhibited high tensile strength and corrosion resistance, the tensile strength not varying at temperatures up to 300° C.

Example III

A similar block as in Example I was placed in a horizontal plane and a wafer of high purity silver chloride 2 mm. thick placed thereover. This composite was placed in a nitrogen atmosphere furnace, heated to 456° C. to melt the silver chloride and cooled. This method provided a completely adherent coating of the silver chloride of the graphite. A sheet of silver was then placed on the silver chloride layer side of the graphite block and the entire structure was reheated in nitrogen about 455° C. at which temperature the silver chloride melted. Subsequent cooling provided a structure having similar properties to that of Example I.

The technique of the instant invention finds particular utility in the production of electronic components particularly in miniaturized parts where space is a critical factor. Other applications include strength and corrosion resistance, the tensile strength not varying at temperatures up to 400° C. This invention is applicable to all forms of graphite including the low permeability, high density types as used in nuclear reactors, as well as the lower density, higher permeability types normally found in dry cells. It is also applicable to bonding of graphite to many other metals, plastics, etc. provided these other materials are first bonded to the described noble metals.

As many widely different embodiments of this invention may be made without departing from the spirit and scope thereof, it is understood that the invention is not limited to the specific embodiments thereof.

What is claimed is:
1. A composite article consisting of a base of graphite, an inner layer of silver chloride fused directly to said graphite, and an outer layer of a member selected from the group consisting of graphite, silver, metals below silver in the electromotive series, glass and ceramics provided on said inner layer.
2. An article according to claim 1 wherein a layer of noble metal is provided between the silver chloride and the outer layer when said outer layer is a member of the group consisting of glass and ceramics.
3. A method of bonding graphite to a material selected from the group consisting of graphite, silver, metals below silver in the electromotive series, glass and ceramics comprising placing a silver chloride layer between the graphite and the material, heating the thus formed sandwich to a temperature of at least about 455° C. and cooling.
4. A method according to claim 3 wherein the material is silver.
5. A method according to claim 3 wherein the silver chloride layer is a solid wafer.
6. A method according to claim 3 wherein the silver chloride layer is formed of particulated material.
7. A method according to claim 3 wherein the silver chloride layer is pre-bonded to the graphite layer.
8. A method according to claim 3 wherein the glass and ceramics are coated with a noble metal before bonding.
9. A method of bonding graphite to a material selected from the group consisting of graphite, silver, metals below silver in the electromotive series, glass and ceramics comprising placing a wafer of silver chloride about .25 to 3 mm. thick between the graphite and the material, heating the thus formed sandwich in an inert atmosphere to a temperature of at least about 455° C. whereby the silver chloride forms a melt and thereafter cooling.
10. A method according to claim 9 wherein the material is silver.
11. A method according to claim 9 wherein the glass and ceramics are coated with a noble metal before bonding.
12. A method according to claim 9 wherein the inert atmosphere is nitrogen.

References Cited

UNITED STATES PATENTS

| | | | |
|---|---|---|---|
| 1,660,650 | 2/1928 | Mailey | 287—20.2 X |
| 2,573,380 | 10/1951 | Ambrose et al. | 161—225 X |
| 3,089,799 | 5/1963 | Domicon | 161—192 |
| 3,096,218 | 7/1963 | Lieb et al. | 136—121 |

OTHER REFERENCES

"Pile-Type Silver Chloride Cells," an abstract of Japan 4919 (1957) in chemical abstracts 52: p. 16092 g (1958).

EARL M. BERGERT, *Primary Examiner.*

R. A. KILLWORTH, *Assistant Examiner.*

U.S. Cl. X.R.

161—225; 136—121